(12) United States Patent
Jia

(10) Patent No.: US 10,917,549 B2
(45) Date of Patent: Feb. 9, 2021

(54) ELECTRONIC DEVICE AND METHOD FOR TAKING PICTURE USING THE SAME

(71) Applicant: Guangdong OPPO Mobile Telecommunications Corp., Ltd., Guangdong (CN)

(72) Inventor: Yuhu Jia, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 28 days.

(21) Appl. No.: 16/430,374

(22) Filed: Jun. 3, 2019

(65) Prior Publication Data

US 2019/0373166 A1 Dec. 5, 2019

(30) Foreign Application Priority Data

Jun. 4, 2018 (CN) .......................... 2018 1 0564923

(51) Int. Cl.
*H04N 5/225* (2006.01)
*H04N 5/232* (2006.01)
*H04M 1/02* (2006.01)

(52) U.S. Cl.
CPC ........ *H04N 5/2257* (2013.01); *H04M 1/0264* (2013.01); *H04N 5/2259* (2013.01); *H04N 5/23293* (2013.01); *H04M 1/0266* (2013.01)

(58) Field of Classification Search
CPC . H04N 5/2257; H04N 5/2259; H04M 1/0264; H04M 1/0266
See application file for complete search history.

(56) References Cited

U.S. PATENT DOCUMENTS

| | | |
|---|---|---|
| 2008/0165267 A1 | 7/2008 | Cok |
| 2013/0135328 A1 | 5/2013 | Rappoport et al. |

(Continued)

FOREIGN PATENT DOCUMENTS

| | | |
|---|---|---|
| CN | 102645836 A | 8/2012 |
| CN | 105282455 A | 1/2016 |
| CN | 106603772 A | 4/2017 |

(Continued)

OTHER PUBLICATIONS

First Office Action from China patent office in a counterpart Chinese patent Application 201810564923.8, dated Feb. 3, 2020 (5 pages).

(Continued)

*Primary Examiner* — Daniel M Pasiewicz

(57) ABSTRACT

An electronic device and method for taking a picture using the electronic device are provided. The electronic device includes a housing, a display screen mounted on the housing, and a camera. The display screen includes a first display region and a second display region. The first display region has a pixel density less than that of the second display region. The camera includes a lens facing toward the first display region. At least a part of the camera is movable, such that the lens of the camera is movable in a plane parallel to the first display region. The lens is configured to take at least two initial pictures at positions in the first display region that are different from each other. A target picture free from pixels of the first display region is synthesized based on the at least two initial pictures.

20 Claims, 12 Drawing Sheets

(56) References Cited

U.S. PATENT DOCUMENTS

2019/0096310 A1* 3/2019 Chen .................... G09G 3/2003
2020/0195764 A1* 6/2020 Xu ....................... H04N 5/2253

FOREIGN PATENT DOCUMENTS

| CN | 106921767 A | 7/2017 |
| --- | --- | --- |
| CN | 107071244 A | 8/2017 |
| CN | 107465777 A | 12/2017 |
| CN | 107580092 A | 1/2018 |
| CN | 207264695 U | 4/2018 |
| CN | 108810201 A | 11/2018 |
| CN | 208384468 U | 1/2019 |

OTHER PUBLICATIONS

International search report, PCT/CN2019/089854, dated Aug. 15, 2019 (4 pages).
European search report, EP19178221, dated Sep. 19, 2019 (6 pages).

* cited by examiner

ELECTRONIC DEVICE AND METHOD FOR TAKING PICTURE USING THE SAME

CROSS-REFERENCE TO RELATED APPLICATION(S)

This application claims priority to Chinese Patent Application No. 201810564923.8, filed on Jun. 4, 2018, the contents of which are herein incorporated by reference in their entireties.

TECHNICAL FIELD

The present disclosure relates to the field of communication device technologies, and in particular, to an electronic device and a method for taking a picture using the electronic device.

BACKGROUND

A screen ratio of an electronic device (the screen ratio is the ratio of an area of a display region of the display screen to an area of a front panel of the electronic device) have always been a main concern for a user. In the related art, the screen ratio of a full-screen electronic device (such as a mobile phone) is up to over 80%. However, since a front camera of the electronic device needs to occupy a portion of space of the front panel, the screen ratio of the electronic device can never reach to 100%, thereby seriously hindering the development of the full-screen electronic device.

SUMMARY

In one aspect, an electronic device is provided. The electronic device may include a housing, a display screen, and a camera. The display screen may be mounted on the housing and defines a first display region and a second display region. The first display region may have a pixel density less than that of the second display region. The camera may be disposed in the housing and comprising a lens facing toward the first display region. At least a part of the camera is movable, such that the lens of the camera is movable in a plane parallel to the first display region. The lens is configured to take at least two initial pictures at positions in the first display region that are different from each other. A target picture free from pixels of the first display region is synthesized based on the at least two initial pictures.

In another aspect, an electronic device is provided. The electronic device may include a housing, a full display screen, and a camera. The full display screen may be mounted on the housing and defines a first display region and a second display region. A plurality of first pixel units are disposed in the first display region, and a plurality of second pixel units arranged in an array are disposed in the second display region. Each of the at least one first pixel unit and the plurality of second pixel units comprises a red pixel configured to emit red light, a green pixel configured to emit green light, and a blue pixel configured to emit blue light. A distance between two adjacent pixels of each of the at least one first pixel unit is greater than a distance between two adjacent pixels of each of the plurality of second pixel units. The camera may be disposed in the housing and comprising a lens facing toward the first display region. At least a part of the camera is movable, such that the lens of the camera is movable in a plane parallel to the first display region. The lens is configured to take at least two initial pictures at positions in the first display region that are different from each other. A target picture free from pixels of the first display region is synthesized based on the at least two initial pictures.

In a further aspect, a method for taking a picture using the electronic device may be further provided. The method may include: turning on the electronic device; taking a first picture at a first position by using the camera; driving at least a part of the camera to move such that the lens of the camera is moved in the plane parallel to the first display region, and taking at least one second picture at a second position different from the first position in the first display region; and synthesizing a target picture free from the pixels of the first display region based on the first picture and the at least one second picture.

BRIEF DESCRIPTION OF DRAWINGS

The above and/or additional aspects and advantages of the present disclosure will become apparent and easily understood from the description with reference to the accompanying drawings. In the drawings.

DETAILED DESCRIPTION

Figure 1:
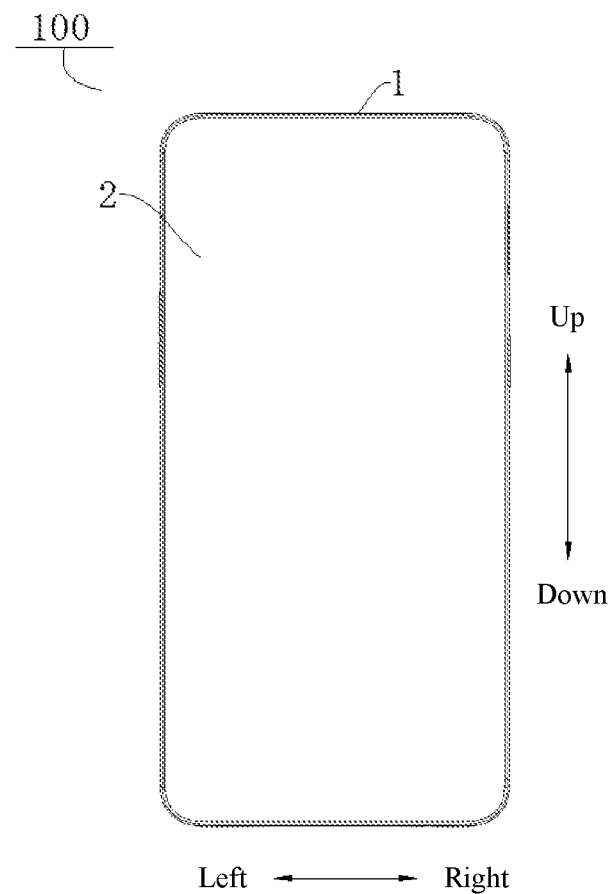
FIG. 1 is a front view of an electronic device according to some embodiments of the present disclosure.

Embodiments of the present disclosure will be described in detail below, and examples of the embodiments will be illustrated in the accompanying drawings. Same or similar reference numerals may be configured to indicate the same or similar elements or elements having the same or similar functions. The embodiments described below with reference to the drawings may be illustrative and may be intended to explain the present disclosure, and cannot be construed as a limitation to the present disclosure.

In the description of the present disclosure, it may be understood that the orientations and locational relations indicated by terms such as "center", "length", "thickness", "top", "down", "front", "rear", "left", "right", "inner", "outer", and the like, refer to the orientations and locational relations illustrated in the accompanying drawings. Thus, these terms used here may be only for describing the present disclosure and for describing in a simple manner, and may be not intended to indicate or imply that the devices or the elements are disposed to locate at the specific directions or structured and performed in the specific directions, which could not to be understood as limiting the present disclosure. In addition, the features defined with "first", "second", and the like may explicitly or implicitly include one or more of the features. In the description of the present disclosure, "a plurality of" means two or more, such as two, three, and the like, unless specified otherwise.

In the present disclosure, it should be noted that, unless specified or limited, otherwise, terms "mounted", "connected", "connected", and the like may be used in a broad sense, and may include, for example, fixed connections, detachable connections, or integral connections; may also be mechanical or electrical connections; may also be direct connections or indirect connections via intervening structures; may also be inner communications of two elements, as can be understood by one skilled in the art depending on specific contexts.

In one aspect, an electronic device is provided. The electronic device may include a housing, a display screen, and a camera. The display screen may be mounted on the housing and defines a first display region and a second display region. The first display region may have a pixel density less than that of the second display region. The camera may be disposed in the housing and comprising a lens facing toward the first display region. At least a part of the camera is movable, such that the lens of the camera is movable in a plane parallel to the first display region. The lens is configured to take at least two initial pictures at positions in the first display region that are different from each other. A target picture free from pixels of the first display region is synthesized based on the at least two initial pictures.

In some embodiments, at least one first pixel unit is disposed in the first display region, and a plurality of second pixel units arranged in an array are disposed in the second display region; an area of each of the at least one first pixel unit is greater than an area of each of the plurality of second pixel units.

In some embodiments, the area of each of the at least one first pixel unit is an integral multiple of a total area of three of the plurality of second pixel units.

In some embodiments, each of the at least one first pixel unit and the plurality of second pixel units comprises a red pixel configured to emit red light, a green pixel configured to emit green light, and a blue pixel configured to emit blue light; a distance between two adjacent pixels of each of the at least one first pixel unit is greater than a distance between two adjacent pixels of each of the plurality of second pixel units.

In some embodiments, the at least one first pixel unit is located in a first row, and three adjacent second pixel units are located in a second row parallel and adjacent to the first row; each of the pixels of the at least one first pixel unit corresponds to one of the three adjacent second pixel units. The red pixel of the at least one first pixel is located in the same column as the red pixel of the corresponding second pixel unit of the three adjacent second pixel units. The green pixel of the at least one first pixel is located in the same column as the green pixel of the corresponding second pixel unit of the three adjacent second pixel units. The blue pixel of the at least one first pixel is located in the same column as the blue pixel of the corresponding second pixel unit of the three adjacent second pixel units.

In some embodiments, the at least one first pixel unit comprises a plurality of rows of first pixel units. The red pixels of the first pixel units in two adjacent rows are in different columns. The green pixels of the first pixel units in two adjacent rows are in different columns. The blue pixels of the first pixel units in two adjacent rows are in different columns.

In some embodiments, the first pixel units in three adjacent rows form one synthesized pixel unit. The red pixels of the first pixel units in three adjacent rows are in different columns. The green pixels of the first pixel units in three adjacent rows are in different columns. The blue pixels of the first pixel units in three adjacent rows are in different columns.

In some embodiments, at least one of the pixels of each of the at least one first pixel unit has a cross section of a circular shape, an elliptical shape, or a polygonal shape.

In some embodiments, at least one of the pixels of each of the plurality of second pixel units has a cross section of a circular shape, an elliptical shape, or a polygonal shape.

In some embodiments, the first display region has a shape of a circle, an ellipse, or a polygon.

In some embodiments, the at least one first pixel unit comprises a plurality of first pixel units. A plurality of pixels of the plurality of first pixel units are arranged in a ring. The plurality of first pixel units are spaced apart from each other in a circumferential direction of the ring.

In some embodiments, the at least one first pixel unit comprises a plurality of first pixel units. A plurality of pixels of the plurality of first pixel units are arranged in a plurality of concentric rings.

In some embodiments, the pixels in two adjacent concentric rings are offset from each other.

In some embodiments, the pixels in two adjacent concentric rings are disposed in one-to-one correspondence, and a line connecting the two pixels in one-to-one correspondence on two adjacent concentric rings extends in a radial direction of the rings.

In some embodiments, three pixels in one-to-one correspondence and disposed respectively in three adjacent rings are configured into one of the at least one first pixel unit.

In some embodiments, three adjacent pixels in the same ring are configured into one of the at least one first pixel unit.

In some embodiments, a pixel capable of becoming transparent is disposed between two adjacent pixels of each of the at least one first pixel unit.

In another aspect, an electronic device is provided. The electronic device may include a housing, a full display screen, and a camera. The full display screen may be mounted on the housing and defines a first display region and a second display region. A plurality of first pixel units are disposed in the first display region, and a plurality of second pixel units arranged in an array are disposed in the second display region. Each of the at least one first pixel unit and the plurality of second pixel units comprises a red pixel configured to emit red light, a green pixel configured to emit green light, and a blue pixel configured to emit blue light. A distance between two adjacent pixels of each of the at least one first pixel unit is greater than a distance between two adjacent pixels of each of the plurality of second pixel units. The camera may be disposed in the housing and comprising a lens facing toward the first display region. At least a part of the camera is movable, such that the lens of the camera is movable in a plane parallel to the first display region. The lens is configured to take at least two initial pictures at positions in the first display region that are different from each other. A target picture free from pixels of the first display region is synthesized based on the at least two initial pictures.

In some embodiments, an area of each of the plurality of first pixel unit is greater than an area of each of the plurality of second pixel units.

In some embodiments, the at least one first pixel unit is located in a first row, and three adjacent second pixel units are located in a second row parallel and adjacent to the first row; each of the pixels of the at least one first pixel unit corresponds to one of the three adjacent second pixel units. The red pixel of the at least one first pixel is located in the same column as the red pixel of the corresponding second pixel unit of the three adjacent second pixel units. The green pixel of the at least one first pixel is located in the same column as the green pixel of the corresponding second pixel unit of the three adjacent second pixel units. The blue pixel of the at least one first pixel is located in the same column as the blue pixel of the corresponding second pixel unit of the three adjacent second pixel units.

In some embodiments, the at least one first pixel unit comprises a plurality of rows of first pixel units. The red pixels of the first pixel units in two adjacent rows are in different columns. The green pixels of the first pixel units in two adjacent rows are in different columns. The blue pixels of the first pixel units in two adjacent rows are in different columns.

In some embodiments, the at least one first pixel unit comprises a plurality of first pixel units. A plurality of pixels of the plurality of first pixel units are arranged in a plurality of concentric rings.

In some embodiments, the pixels in two adjacent concentric rings are disposed in one-to-one correspondence, and a line connecting the two pixels in one-to-one correspondence on two adjacent concentric rings extends in a radial direction of the rings.

In a further aspect, a method for taking a picture using the electronic device may be further provided. The method may include: turning on the electronic device; taking a first picture at a first position by using the camera; driving at least a part of the camera to move such that the lens of the camera is moved in the plane parallel to the first display region, and taking at least one second picture at a second position different from the first position in the first display region; and synthesizing a target picture free from the pixels of the first display region based on the first picture and the at least one second picture.

In some embodiments, at least one first pixel unit is defined in the first display region, each of the at least one first pixel unit comprises a red pixel configured to emit red light, a green pixel configured to emit green light, and a blue pixel configured to emit blue light. A pixel capable of becoming transparent is disposed between two adjacent pixels of each of the at least one first pixel unit. The pixel that is capable of becoming transparent and disposed between the two adjacent pixels of the first pixel unit is controlled to be transparent before the camera takes a picture.

An electronic device 100 according to some embodiments of the present disclosure will be described below with reference to the drawings.

Figure 2:
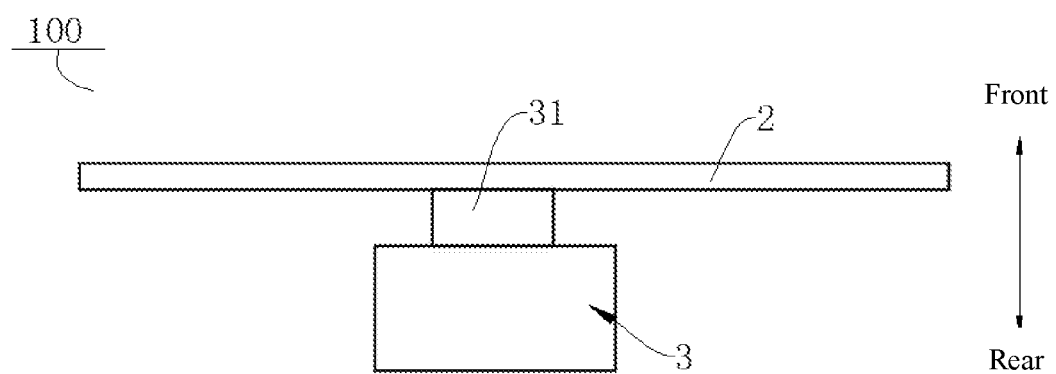
FIG. 2 is a schematic structural view of the electronic device according to some embodiments of the present disclosure.

As shown in FIG. 1 and FIG. 2, the electronic device 100 according to some embodiments of the present disclosure may include: a housing 1, a display screen 2, and a camera 3.

It should be noted that "electronic device 100" used herein may include, but be not limited to, an apparatus receiving/transmitting communication signals via wired connection (for example, public switched telephone network (PSTN), digital subscriber line (DSL), digital cable, electric cable and/or another data connection/network), and/or via wireless interface (for example, cellular network, Wireless Area Networks (WLAN), digital television network such as DVB-H (Digital Video Broadcasting Handheld) network, satellite network, AM-FM broadcast transmitter and/or another communication terminal of wireless interface). The communication terminal communicating via the wireless interface may also be called as a "wireless communication terminal", "wireless terminal" and/or "electronic device". Examples of the electronic device may include, but be not limited to, a satellite or cellular telephone; a personal communication system (PCS) terminal that can combine a cellular radio telephone with functions of data processing, fax, and data communication; a personal digital assistant (PDA) including a radio telephone, a pager, an Internet/intranet access, a web browser, a notepad, a calendar, and/or a global positioning system (GPS) receiver; and a conventional laptop, and/or a palmtop receiver or other electronic apparatuses 100 including radio telephone transceivers.

Figure 3:
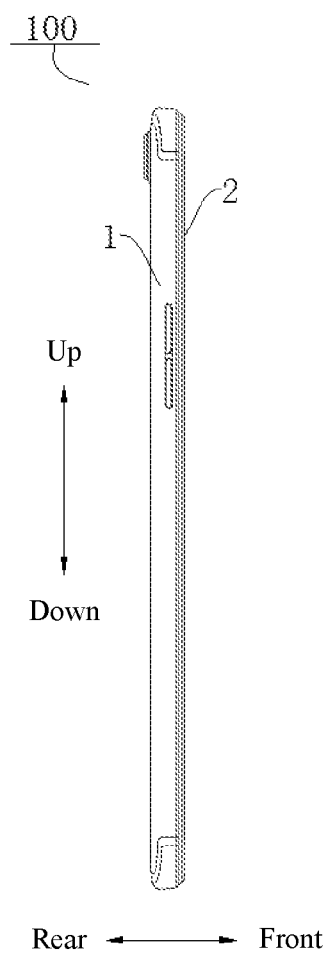
FIG. 3 is a left view of the electronic device according to some embodiments of the present disclosure.
Figure 5:
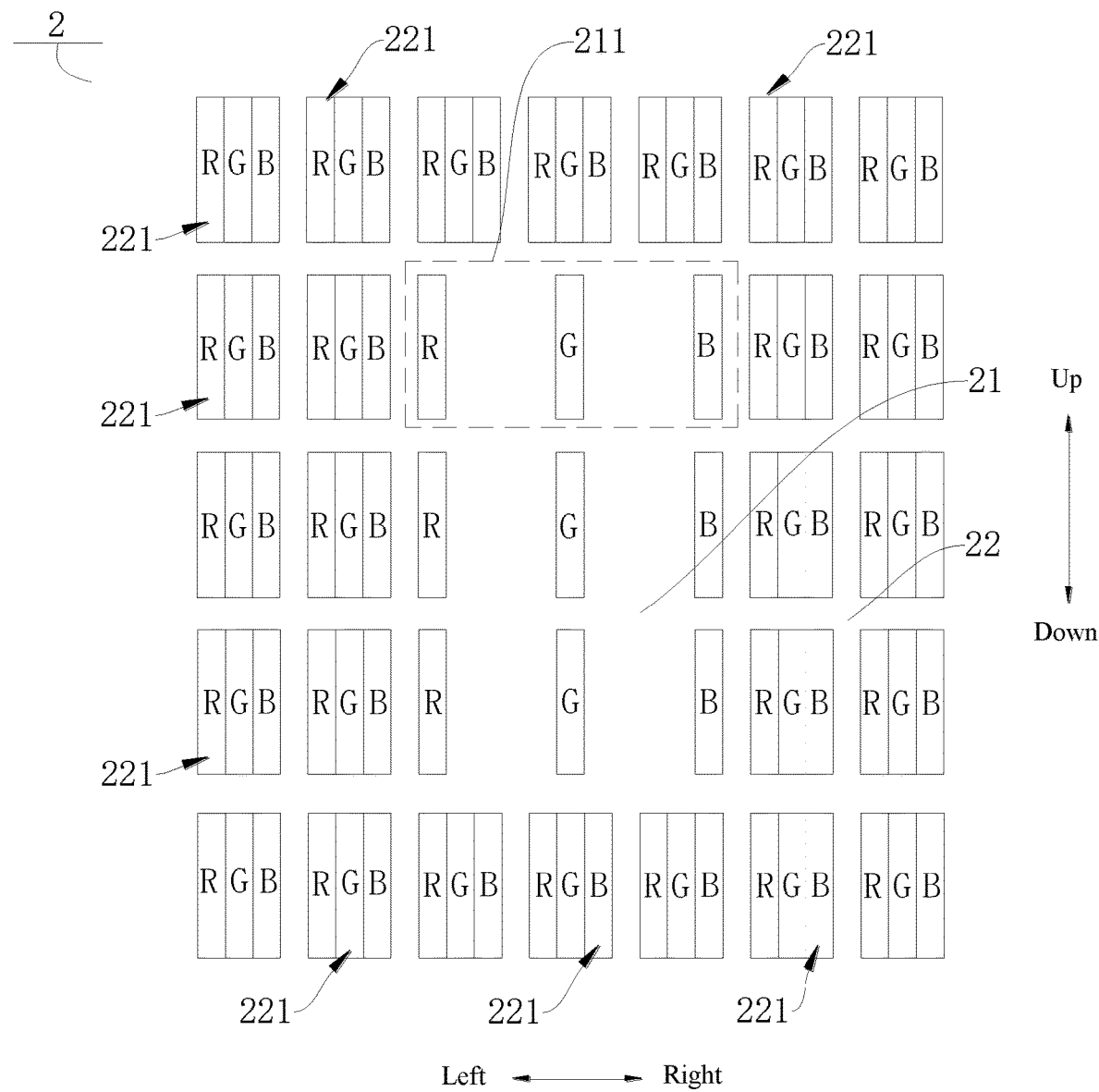
FIG. 5 is a partial view of a display screen of the electronic device according to some embodiments of the present disclosure.
Figure 6:
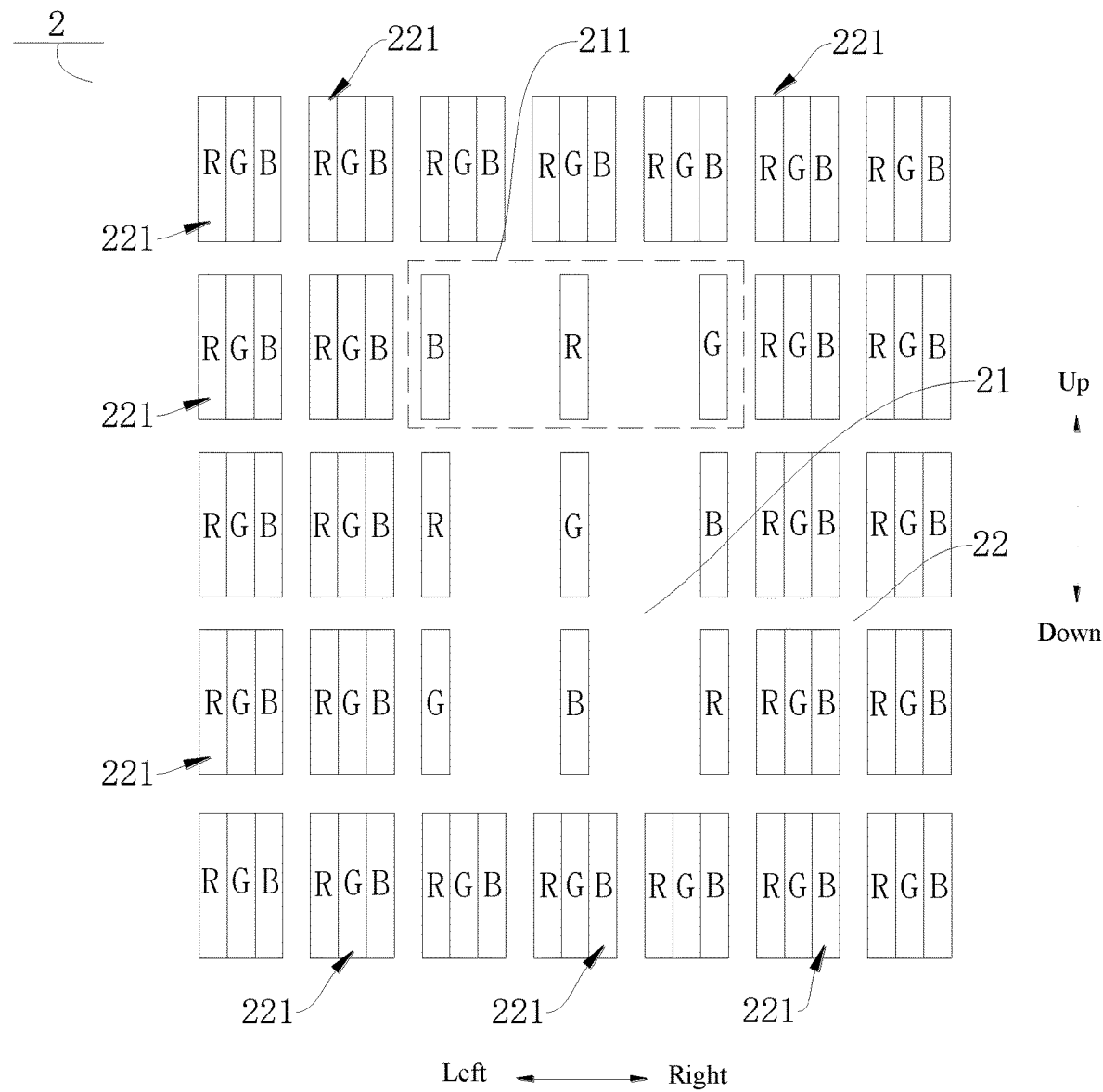
FIG. 6 is a partial view of a display screen of the electronic device according to some embodiments of the present disclosure.

As shown in FIG. 3, FIG. 5 and FIG. 6, the display screen 2 may be mounted on the housing 1. The display screen 2 may define a first display region 21 and a second display region 22. The first display region 21 may have a pixel density less than that of the second display region 22. A display effect of the display screen 2 may be related to the pixel density of the display screen 2. More specifically, the display screen 2 with a greater pixel density may exhibit a clearer display effect, while the display screen 2 with a less pixel density may have a better transmittance than that of the display screen 2 with the greater pixel density. Thus, the transmittance of the first display region 21 having a lower pixel density may be greater than the transmittance of the second display region 22.

Figure 7:
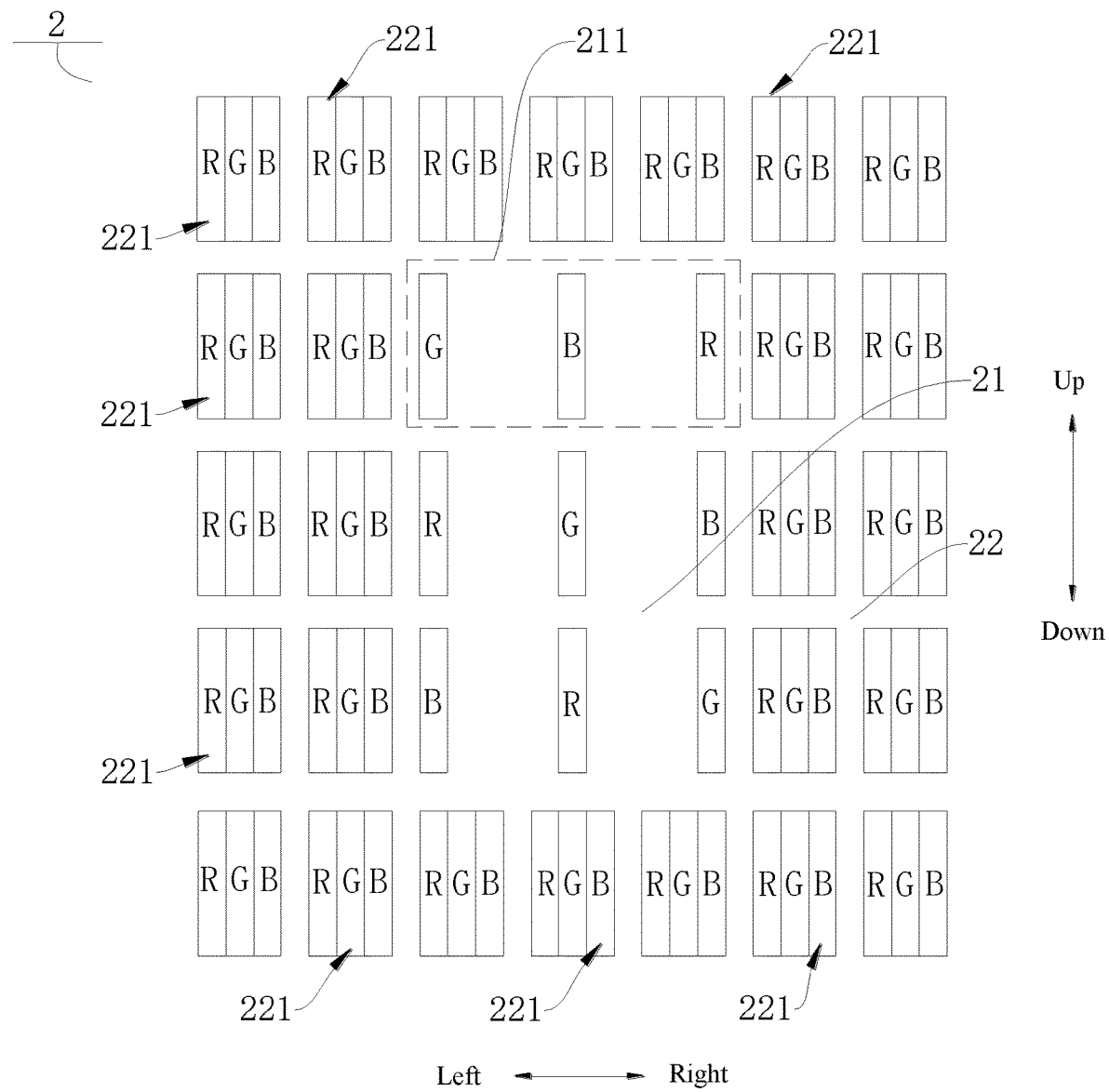
FIG. 7 is a partial view of a display screen of the electronic device according to some embodiments of the present disclosure.

As shown in FIGS. 2, 3 and 7, the camera 3 may be disposed in the housing 1 and may include a lens 31 disposed toward the first display region 21. At least a part of the camera 3 may be movable, such that the lens 31 of the camera 3 may be move in a plane parallel to the first display region 21. The lens 31 may be configured to take at least two initial pictures at positions in the first display region 21, and the positions are different from each other. After that, a target picture free from pixels in the first display region 21 may be synthesized based on the at least two initial pictures. In some embodiments, the camera 3 may be disposed under the display screen 2, and covered by the display screen 2. In some embodiments, the camera 3 may be covered by the first display region 21.

In this way, when a user uses the electronic device 100 to take a picture, a part of the lights reflected by the scene may pass through a gap between two adjacent pixels in the first display region 21 of the display screen 2, enter the lens 31 of the camera 3, and be further processed by the camera 3, such that a first picture may be taken. At least a part of the camera 3 may then be moved, such that the lens 31 may be moved to a preset position in the plane parallel to the first display region 21. Thus, a second picture is taken. The processes will be repeated. That is to say, the lens 31 may be further moved to another position different from the positions before, and further pictures may be taken. In this way, it is possible to take a plurality of pictures at a plurality of positions. Thus, effective pixels in the plurality of pictures may be further synthesized by using a software algorithm, and a clear and complete picture may be acquired as a result.

It should be noted that, at least a part of the camera 3 described above is movable, such that the lens 31 of the camera 3 is movable in the plane parallel to the first display region 21. It can be understood that, the lens 31 is a part of the camera 3. It is possible that the entire camera 3 including the lens 31 is movable in the plane parallel to the first display region 21, such that the lens 31 of the camera 3 is movable in the plane parallel to the first display region 21. It is also possible that only the lens 31 is movable in the plane parallel to the first display region 21, or the lens 31 and one or more components connected to the lens 31 is movable in the plane parallel to the first display region 21, such that the lens 31 of the camera 3 is movable in the plane parallel to the first display region 21.

More specifically, when the user takes the first picture by the camera 3, the pixels located in the first display region 21 may block a part of the lights, such that it is impossible to take a complete picture. When the camera 3 controls the lens 31 to move in the plane parallel to the first display region 21 to a certain position, a blocked portion of the picture taken by the camera 3 at this time may be offset from the block portion of the first picture. In this way, it is possible to acquire a target picture free from the pixels in the first display region 21 by taking a plurality of pictures at a plurality of positions, and synthesizing the effective pixels in the plurality of pictures by using a software algorithm.

According to the electronic device 100 of some embodiments of the present disclosure, the camera 3 may be disposed in the housing 1, thereby reducing the space of the display screen 2 occupied by the camera 3 and increasing the screen ratio of the electronic device 100. Thus, a full screen display may be achieved. In addition, the display screen 2 defines the first display region 21 and the second display region 22, the first display region 21 has a pixel density less than that of the second display region 22, and the lens 31 of the camera 3 is disposed toward the first display region 21. In this way, when the user is taking picture using the camera 3, the lights reflected by the scene may pass through a non-pixel area of the first display region 21 and further enter the camera 3 to finish the shooting. At least a part of the camera 3 may be moved, such that the lens 31 may be moved to different positions in the first display region 21 to take at least two pictures. The target picture that is not blocked by the pixels of the first display region 21 may be acquired by synthesizing the captured pictures. In this way, it is possible to achieve the full screen display and meanwhile ensure the shooting quality of the camera 3.

Herein, the non-pixel region refers to the region in which no pixels are disposed.

Figure 4:
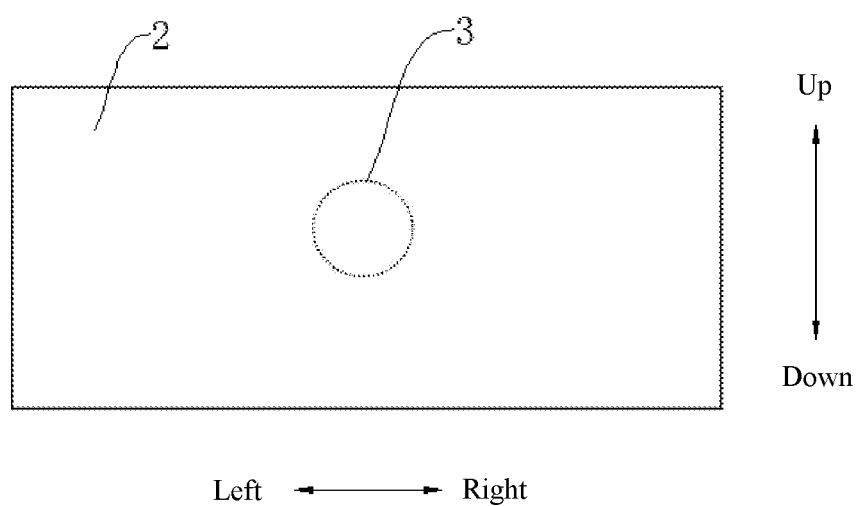
FIG. 4 is a partial view of the electronic device according to some embodiments of the present disclosure.

According to some embodiments of the present disclosure, as shown in FIG. 4, FIG. 5 and FIG. 7, the first display region 21 may include at least one first pixel unit 211. That is to say, at least one first pixel unit 211 is disposed in the first display region 21. The second display region 22 may include a plurality of second pixel units 221 arranged in an array. That is to say, the plurality of second pixel units 221 arranged in an array are disposed in the second display region 22. An area of each first pixel unit 211 may be greater than an area of each second pixel unit 221. The first display region 21 may include one, two, three, four or more first pixel units 211. Each first pixel unit 211 and each second pixel unit 221 may exhibit various colors. In this case, since each first pixel unit 211 has a greater area, the transmittance of each first pixel unit 211 may be greater than the transmittance of each second pixel unit 221. In this way, it is possible to reduce an amount of incident lights blocked by each first pixel unit 211, thereby improving the area of the effective pixels in the picture taken by the camera 3.

In some embodiments of the present disclosure, as shown in FIGS. 5 and 6, the area of each first pixel unit 211 may be an integral multiple of a total area of three second pixel units 221. The area of each first pixel unit 211 may be one, two, three, or more times the total area of three second pixel units 221. Thus, each first pixel unit 211 may have the transmittance greater than that of each second pixel unit 221. In this way, it is possible to reduce the amount of incident lights blocked by each first pixel unit 211, thereby improving the area of the effective pixels in the picture taken by the camera 3.

In some embodiments of the present disclosure, as shown in FIG. 5, each of the at least one first pixel unit 211 and the plurality of second pixel units 221 include three pixels including a red pixel R (R shown in FIG. 5) configured to emit red light, a green pixel G (G shown in FIG. 5) configured to emit green light, and a blue pixel B (B shown in FIG. 5) configured to emit blue light. A distance between two adjacent pixels (for example, between the red pixel R and the green pixel G, between the red pixel R and the blue pixel B, or between the green pixel G and the blue pixel B) of each first pixel unit 211 may be greater than a distance between two adjacent pixels of each second pixel unit 221. When the user is taking pictures using camera 3, the lights reflected by the scene may be transmitted between the two adjacent pixels. Since the distance between two adjacent pixels of each first pixel unit 211 is greater than the distance between two adjacent pixels of each second pixel unit 221, more lights may be transmitted through each first pixel unit 211. In this way, it is possible to reduce the amount of incident lights blocked by each first pixel unit 211, thereby improving the area of the effective pixels in the picture taken by the camera 3.

It should be noted that, different percentages of the red pixel R, the green pixel G, and the blue pixel B may be output and combined with each other, such that each first pixel unit 211 or each second pixel unit 221 may exhibit different colors. Thus, the red pixel R, the green pixel G, and the blue pixel B may be combined into any type of colors.

Further, as shown in FIG. 5, the pixels R, G, and B of each first pixel unit 211 are located in pixel columns the same with the pixels R, G, and B of the three second pixel units 221. The three second pixel units are located in a pixel row adjacent to each of the at least one first pixel unit and spaced apart from each other at an equal distance. In other words, the pixels R, G, and B of each first pixel unit 211 respectively correspond to the three second pixel units 221 in the row adjacent to the corresponding first pixel unit 211. The three second pixel units 221 may be spaced apart from each other at an equal distance. Besides, the red pixel R of the second pixel unit 221 corresponding to the red pixel R of the first pixel unit 211 may be located in the same pixel column with the red pixel R of the first pixel unit 211. The green pixel G of the second pixel unit 221 corresponding to the green pixel G of the first pixel unit 211 may be located in the same pixel column with the green pixel G of the first pixel unit 211. The blue pixel B of the second pixel unit 221 corresponding to the blue pixel B of the first pixel unit 211 may be located in the same pixel column with the blue pixel B of the first pixel unit 211.

That is to say, the at least one first pixel unit 211 may be located in a first row, and three adjacent second pixel units 221 may be located in a second row parallel and adjacent to the first row. Each of the pixels (red pixel R, green pixel G, blue pixel B) of the at least one first pixel unit 211 corresponds to one of the three adjacent second pixel units 221. The red pixel R of the at least one first pixel 211 is located in the same column as the red pixel R of the corresponding second pixel unit 221 of the three adjacent second pixel units 221. The green pixel G of the at least one first pixel 211 is located in the same column as the green pixel G of the corresponding second pixel unit 221 of the three adjacent second pixel units 221. The blue pixel B of the at least one first pixel 211 is located in the same column as the blue pixel B of the corresponding second pixel unit 221 of the three adjacent second pixel units 221.

In this way, it is possible to reduce the difficulty of the arrangement of the pixels. Besides, the manufacturing cycles of each first pixel unit 211 and each second pixel unit 221 may be shortened, and the production cost may be reduced. It should be noted that, the three second pixel units 221 may be three second pixel units 221 disposed continuously. It is also possible that one or more first pixel units 211 may be disposed between every two adjacent second pixel units 221 of the three second pixel units 221.

In some embodiments of the present disclosure, as shown in FIG. 6 and FIG. 7, the pixels R, G, B respectively of one first pixel unit 211 may be located in pixel columns different from pixel columns in which the pixels R, G, and B of another first pixel unit 211 in the same pixel column and the adjacent row are located. That is, the red pixel R of one first pixel unit 211 is located in a pixel column different from another pixel column in which the red pixel R of another first pixel unit 211 in a pixel row adjacent to the one first pixel unit 211 is located. The green pixel G of one first pixel unit 211 is located in a pixel column different from another pixel column in which the green pixel G of another first pixel unit 211 in a pixel row adjacent to the one first pixel unit 211 is located. The blue pixel B of one first pixel unit 211 is located in a pixel column different from another pixel column in which the blue pixel B of another first pixel unit 211 in a pixel row adjacent to the one first pixel unit 211 is located. In this way, it is possible to increase the diversity of the positions of the pixels, such that a plurality of different imaging effects may be exhibited. Besides, the pixels in the same column are of different types, such that various colors may be synthesized by the pixels in the same column. Thus, it is possible to avoid located positions from having a too single color.

That is to say, the at least one first pixel unit 211 may include a plurality of rows of first pixel units 211. The red pixels R of the first pixel units 211 in two adjacent rows are in different columns. The green pixels G of the first pixel units 211 in two adjacent rows are in different columns. The blue pixels B of the first pixel units 211 in two adjacent rows are in different columns.

Herein, as shown in FIGS. 6 and 7, the first pixel units 211 in different rows described above are disposed correspondingly to or aligned with each other in a column direction (the up-down direction shown in FIG. 6). Further, as shown in FIG. 6 and FIG. 7, the three adjacent first pixel units 211 in the same column may form one synthesized pixel unit. Herein, the three adjacent pixel units 211 are disposed correspondingly to or aligned with each other in the column direction (the up-down direction shown in FIG. 6). The pixels R, G, and B respectively of the three adjacent first pixel units 211 may be located in pixel columns different from each other. That is to say, the red pixels R respectively of the three first pixel units 211 may be located in pixel columns different from each other. The green pixels G respectively of the three first pixel units 211 may be located in pixel columns different from each other. The blue pixels B respectively of the three first pixel units 211 may be located in pixel columns different from each other. In other words, the red pixels R of the first pixel units 211 in three adjacent rows are in different columns. The green pixels G of the first pixel units 211 in three adjacent rows are in different columns. The blue pixels B of the first pixel units 211 in three adjacent rows are in different columns.

In this way, the three first pixel units 211 in the same column may be combined into any color, such that the imaging of the length direction (such as the up-down direction shown in FIG. 6) of the region in which the first pixel unit 211 is located may be clearer.

Figure 9:
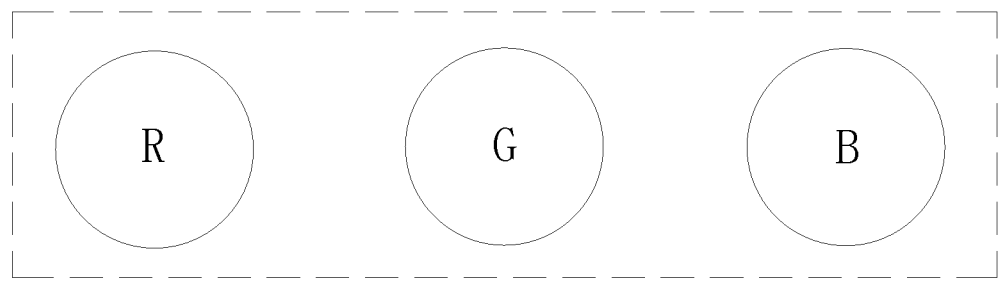
FIG. 9 is a schematic structural view of a first pixel unit of the electronic device according to some embodiments of the present disclosure.

In some embodiments of the present disclosure, as shown in FIGS. 1 and 9, at least one of the three pixels of each first pixel unit 211 may have a cross section of a circular shape, an elliptical shape, or a polygonal shape. In other words, it is possible that one of the three pixels of each first pixel unit 211 has a cross section of a circular shape, an elliptical shape, or a polygonal shape. Or, it may also be possible that two of the three pixels of each first pixel unit 211 have a cross section of a circular shape, an elliptical shape, or a polygonal shape. Or, it may also be possible that each of the three pixels of each first pixel unit 211 has a cross section of a circular shape, an elliptical shape, or a polygonal shape. The shapes of the cross sections respectively of the three pixels of each first pixel unit 211 may be designed based on the model and size of the electronic device 100, such that the display screen 2 of the electronic device 100 may have a better imaging effect. For example, in the embodiment shown in FIG. 9, the pixels R, G, B of each first pixel unit 211 may each have a cross section of a circular shape.

Figure 10:
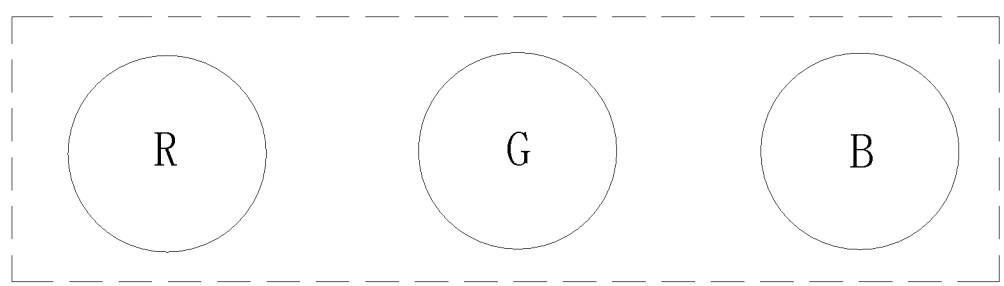
FIG. 10 is a schematic structural view of a second pixel unit of the electronic device according to some embodiments of the present disclosure.
Figure 11:
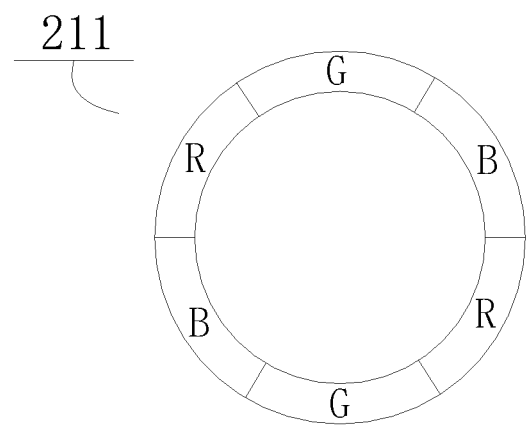
FIG. 11 is a schematic structural view of a first pixel unit of the electronic device according to some embodiments of the present disclosure.

In some embodiments of the present disclosure, as shown in FIGS. 1 and 10, at least one of the three pixels of each second pixel unit 221 may have a cross section of a circular shape, an elliptical shape, or a polygonal shape. In other words, it is possible that one of the three pixels of each second pixel unit 221 has a cross section of a circular shape, an elliptical shape, or a polygonal shape. Or, it may also be possible that, two of the three pixels of the second pixel unit 221 each have a cross section of a circular shape, an elliptical shape, or a polygonal shape. Or, it may also be possible that each of the three pixels of each second pixel unit 221 has a cross section of a circular shape, an elliptical shape, or a polygonal shape. The shapes of the cross sections of the three pixels respectively of the second pixel unit 221 may be designed based on the model and size of the electronic device 100, such that the display screen 2 of the electronic device 100 may have a better imaging effect. For example, in the embodiment shown in FIG. 10, the pixels R, G, B of each second pixel unit 221 may have a cross section of a circular shape.

Figure 12:
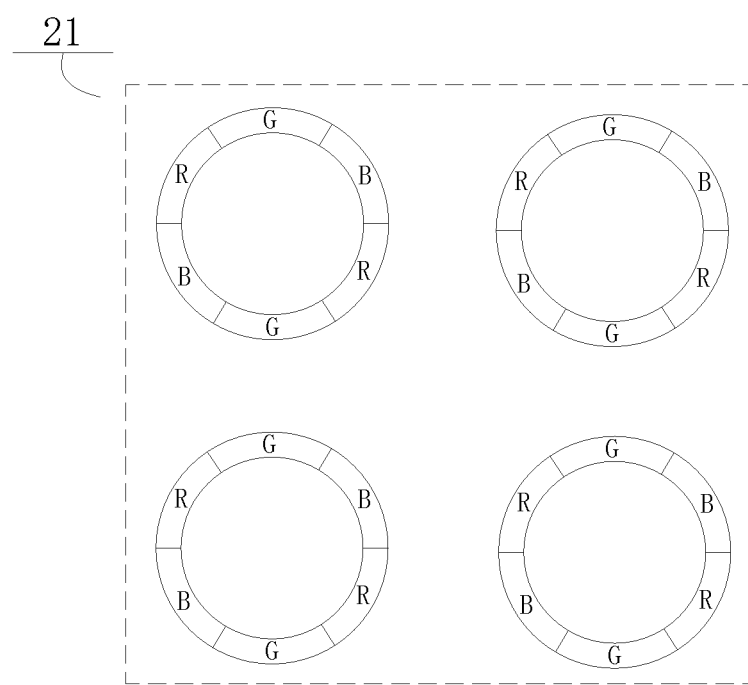
FIG. 12 is a schematic structural view of a first display region of the electronic device according to some embodiments of the present disclosure.

In some embodiments of the present disclosure, as shown in FIGS. 1, 5, and 12, the first display region 21 may have a shape of a circle, an ellipse, or a polygon. In this way, it is possible to increase the diversity of the shapes of the first display region 21, and select the shape suitable to the first display region 21 base on the model and size of the electronic device 100, such that the display screen 2 of the electronic device 100 may have a better imaging effect. For example, in the embodiment shown in FIG. 5, the first display region may be in shape of a rectangle.

In some embodiments of the present disclosure, as shown in FIG. 1, FIG. 2, FIG. 11 and FIG. 12, a plurality of first pixel units 211 may be provided, and all pixels of the plurality of first pixel units 211 may be arranged in a ring. The plurality of first pixel units 211 may be spaced apart from each other in a circumferential direction of the ring. In this way, the plurality of pixels arranged in the ring may enhance the transmittance of the first display region 21, thereby increasing the amount of lights entering the camera 3 during shooting, and in turn improving the shooting effect of the camera 3. For example, in the embodiment shown in FIG. 11, two first pixel units 211 are shown, and all pixels of the two first pixel units 211 are arranged in a ring. For another example, in the embodiment shown in FIG. 12, eight first pixel units 211 may be disposed in the first display region 21, and every two first pixel units 211 form a ring. However, it is also possible that each first pixel unit 211 form a ring, or three or more first pixel units 211 form a ring.

Figure 13:
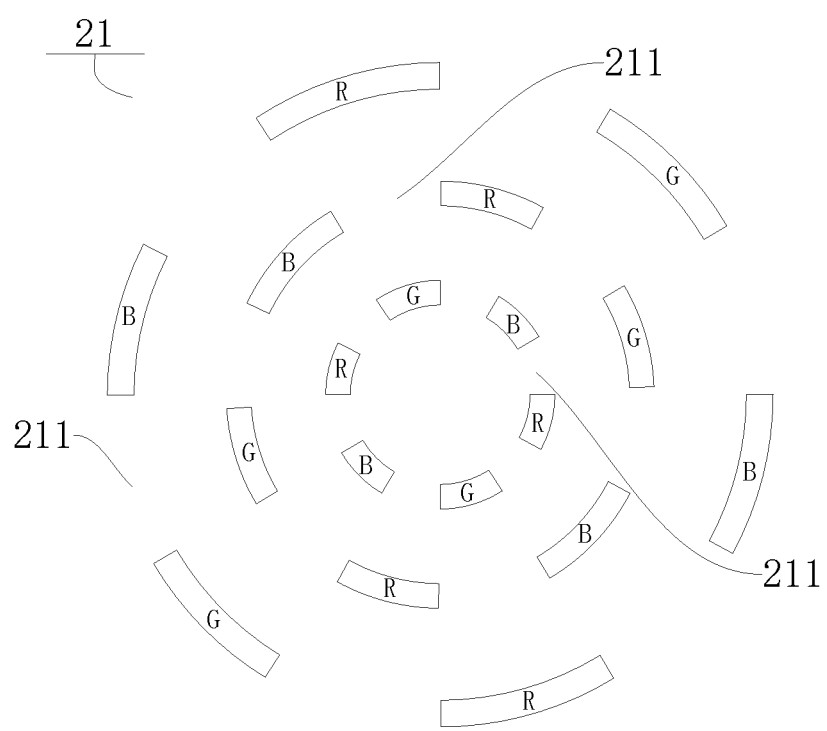
FIG. 13 is a schematic structural view of a first display region of the electronic device according to some embodiments of the present disclosure.
Figure 14:
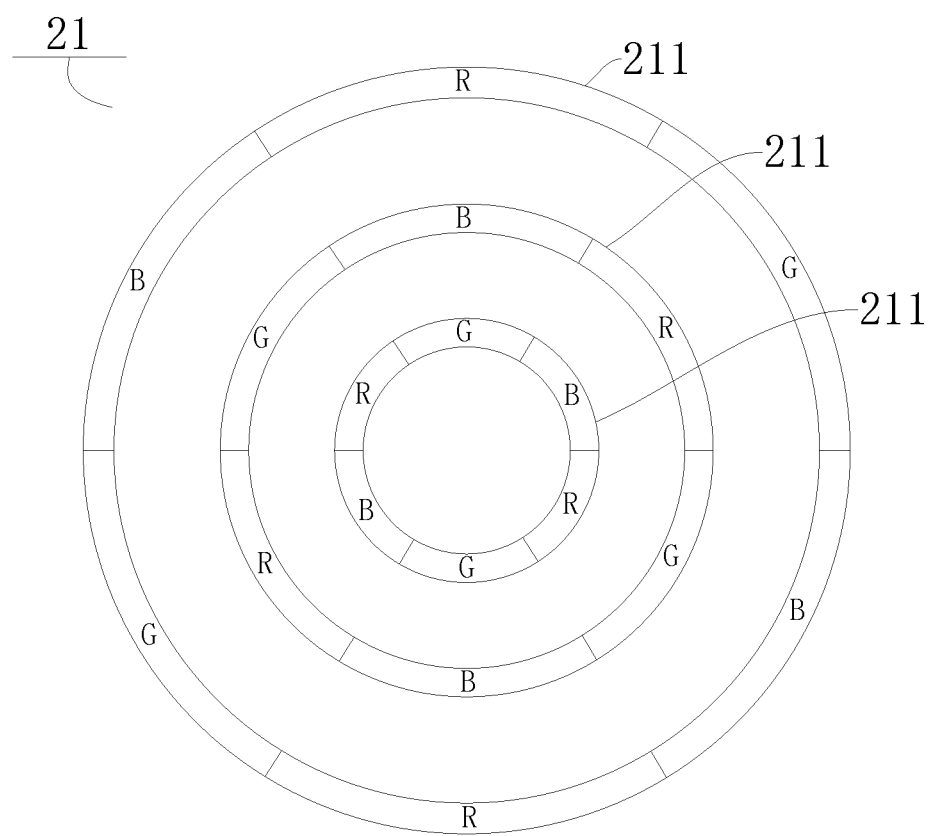
FIG. 14 is a schematic structural view of a first display region of the electronic device according to some embodiments of the present disclosure.
Figure 15:
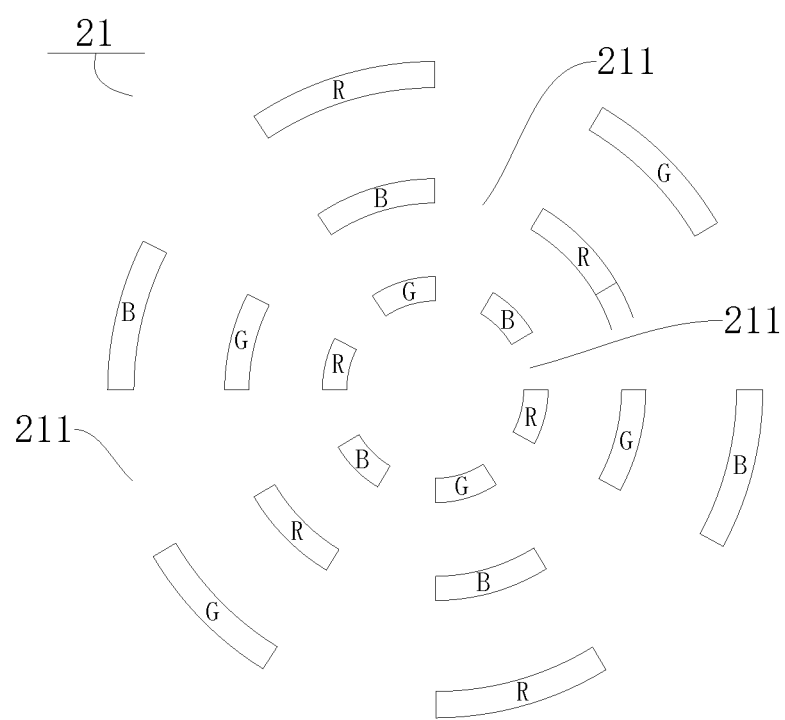
FIG. 15 is a schematic structural view of a first display region of the electronic device according to some embodiments of the present disclosure.

In some embodiments of the present disclosure, as shown in FIG. 1, FIG. 2 and FIG. 13, a plurality of first pixel units 211 may be provided. All sub-pixels of the plurality of first pixel units 211 may be arranged in a plurality of concentric rings. Therefore, all pixels arranged in a plurality of concentric rings may improve the transmittance of the first pixel unit 211, thereby increasing the amount of lights entering the first display region 21, and in turn improving the shooting effect of the camera 3. For example, in the embodiment shown in FIGS. 13 and 14, six first pixel units 211 may be disposed in the first display region 21, and the six first pixel units 211 may be arranged in three concentric rings. That is to say, each of the concentric rings is formed by two first pixel units 211. However, it is also possible that each of the concentric rings is formed by one first pixel unit 211, or formed by three or more first pixel units 211.

Further, as shown in FIG. 1, FIG. 2 and FIG. 13, the pixels respectively in two adjacent concentric rings may be offset from each other. Therefore, the pixels offset from each other may improve the display uniformity of the screen. Different percentages of pixels may be output and combined with each other, such that the area covered by the concentric rings may exhibit different colors, thereby improving the display effect of the first display region 21. For example, in the embodiment shown in FIG. 13, three concentric rings may be provided, and the pixels on every two adjacent concentric rings may be offset from each other to improve the display uniformity of images.

In some embodiments, as shown in FIG. 13, the pixels of the first pixel units 211 in each concentric ring are spaced apart from each other, such that a gap is formed between every two adjacent pixels of the first pixel units 211 in the same concentric ring. The pixels of the first pixel units 211 in the adjacent concentric ring are disposed corresponding to the gaps.

In some embodiments of the present disclosure, as shown in FIG. 1, FIG. 2, FIG. 14, and FIG. 15, the pixels in two adjacent concentric rings may be disposed in one-to-one correspondence. A line connecting the two pixels on two concentric rings and in one-to-one correspondence may extend in a radial direction of the rings at which the two pixels are located. In this way, it may be convenient to control and adjust the output percentage of each pixel, such that the area covered by the concentric rings may exhibit different colors, thereby improving the display effect of the first display region 21.

Further, as shown in FIG. 1, FIG. 2, FIG. 14 and FIG. 15, three pixels in one-to-one correspondence and disposed respectively on the three adjacent rings may be configured into one first pixel unit 211. Thus, the three pixels in one-to-one correspondence on the three adjacent rings may include the red pixel R, the blue pixel B, and the green pixel G. The red pixel R, the blue pixel B, and the green pixel G can be combined with each other with different output percentages, such that the area covered by the concentric rings may exhibit different colors, thereby enhancing the display effect of the first display region 21.

In some embodiments of the present disclosure, as shown in FIGS. 1, 2, 14, and 15, three adjacent pixels in the same ring may be configured into one first pixel unit 211. Thus, the three pixels in the same ring may include the red pixel R, the blue pixel B, and the green pixel G. The red pixel R, the blue pixel B, and the green pixel G may be combined with each other with different output percentages, such that the area covered by the first pixel unit 211 in shape of a ring may exhibit different colors, thereby enhancing the display effect of the first display region 21.

Figure 8:
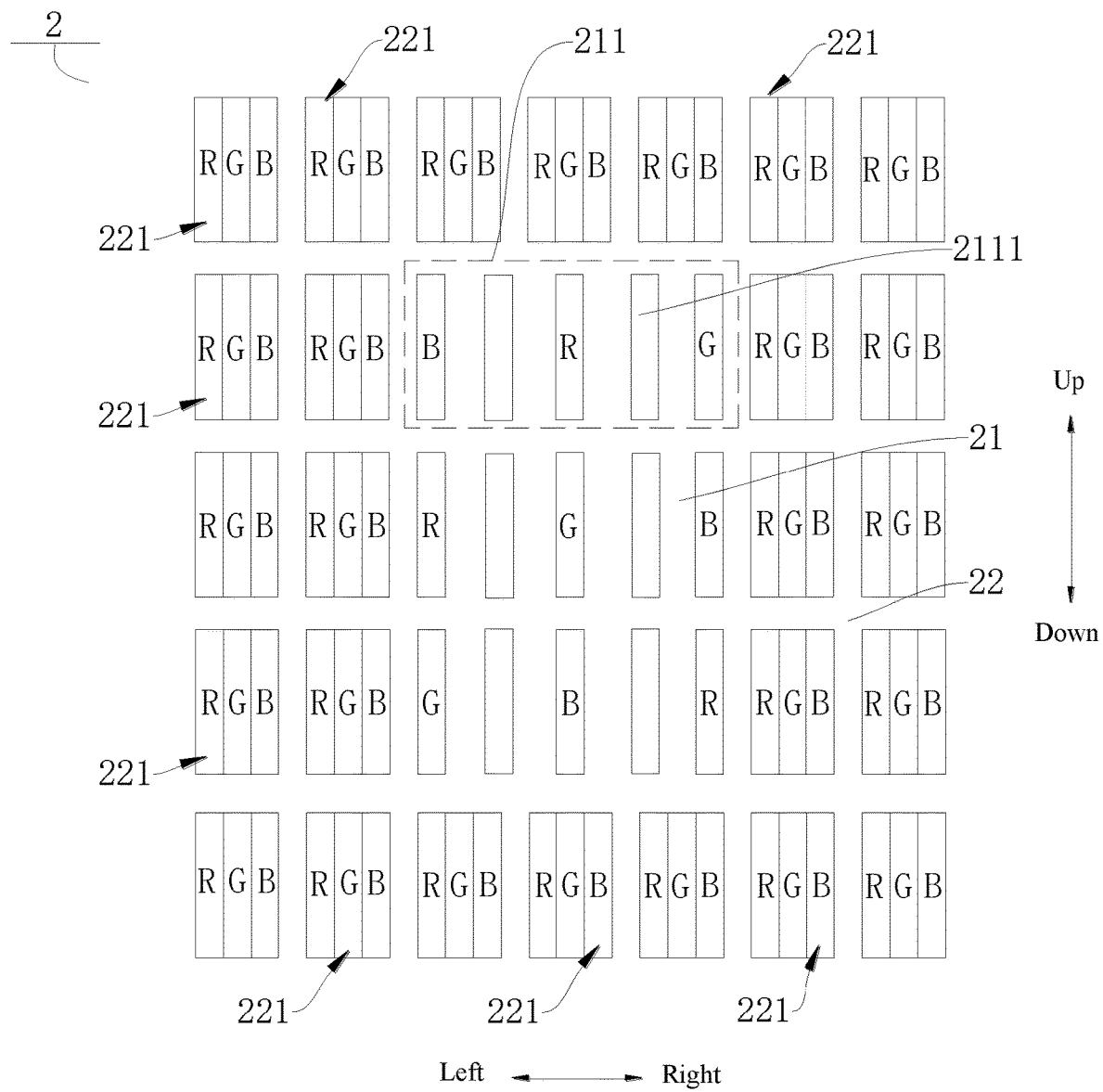
FIG. 8 is a partial view of a display screen of the electronic device according to some embodiments of the present disclosure.

In some embodiments of the present disclosure, as shown in FIGS. 1 and 8, a pixel 2111 that is controllable to be transparent (that is, the pixel 2111 is capable of becoming transparent and non-transparent) may be disposed between two adjacent pixels of each first pixel unit 211. Therefore, when no shooting is performed, the transparent pixel 2111 may be displayed in colors. At this time, two adjacent pixels of each first pixel unit 211 and the transparent pixel 2111 disposed between the two pixels can be displayed together, which makes the pictures of the display screen 2 more delicate and clear. When the shooting is performed, the transparent pixel 2111 disposed between the two adjacent pixels of each first pixel unit 211 may be controlled to turn into transparent, such that the transparent pixel 2111 may not block the lights reflected by the scene. In this way, normal display and shooting may be completed.

It should be noted that, the transparent pixel 2111 may be made of transparent material. The transparent pixel 2111 may be normally displayed during working, and may be transparent when it is not working. Of course, the present disclosure may be not limited thereto, and it is also possible to dispose no transparent pixel 2111 between two adjacent pixels of each first pixel unit 211.

According to some embodiments of the present disclosure, as shown in FIG. 1 and FIG. 2, the display screen 2 may be an OLED (Organic Light-Emitting Diode) screen, a Mini LED (Mini Light-Emitting Diode) screen, or a Micro LED (Micro Light-Emitting Diode) screen. The OLED screen, the Mini LED screen, and the Micro LED screen are self-illuminous screens without needing a backlight source. In this way, it is possible to omit the backlight plate in the related art, which in turns reduces a thickness of the display screen 2, and thus the transmittance of the display screen 2 may be increased as a result.

According to some embodiments of the present disclosure, the camera 3 may include a voice coil motor. The voice coil motor may be connected to the lens 31, and configured to drive the lens 31 to move in the plane parallel to the first display region 21. A receiving cavity may be defined in the middle of the voice coil motor. The lens 31 of the camera 3 may be received in the receiving cavity. The voice coil motor may be configured to drive the lens 31 to move in the receiving cavity. In this way, the voice coil motor may drive the lens 31 to stably move in the plane parallel to the first display region 21. Besides, the space occupied by the voice coil motor may be small, such that the camera 3 may be more compact, and thus the camera 3 may be miniaturized.

Further, the voice coil motor may be configured to drive the lens 31 to move to a plurality of positions in the left-right direction and different from each other. The lens is configured to take at least one picture at each position. Therefore, when the user is taking pictures using the camera 3, the lights reflected by the scene may pass through the first display region 21 and enter the lens 31 of the camera 3, and the first picture may be taken after being processed by the camera 3. After that, the voice coil motor may drive the lens 31 of the camera 3 to move a preset distance in the left-right direction, and the second picture is taken. The processes will be repeated. In this way, it is possible to take a plurality of pictures at a plurality of positions. The effective pixels in the plurality of pictures may be further synthesized, and thus a clear and complete picture may be acquired in this way.

It should be noted that, each pixel of the first display region 21 may be rectangular, and the longer side of the rectangle may extend in the direction the same as the length direction of the electronic device 100 (the up-down direction as shown in FIG. 5). The lens 31 may be offset from the pixel by moving the lens 31 along the left-right direction (the left-right direction as shown in FIG. 5). In this way, it is possible to take a plurality of pictures at a plurality of positions. The effective pixels in the plurality of pictures may be further synthesized by using the software algorithm, and thus a picture having a complete pixel may be acquired.

Of course, the present disclosure may be not limited thereto. The longer side of the rectangular pixel dot may also be perpendicular to the length direction of the electronic device 100 (the up-down direction as shown in FIG. 5). At this time, the motor of the camera 3 may drive the lens 31 of the camera 3 to move to different positions in the up-down direction (the up-down direction as shown in FIG. 5), in order to take at least one picture at each position. The plurality of pictures may be further synthesized into a picture having a complete pixel by using the software algorithm.

According to some embodiments of the present disclosure, as shown in FIG. 1, an edge of the display screen 2 may extend to an inner side wall of the housing 1. In this way, the screen ratio of the display screen 2 may reach to approximately 100%, such that the electronic device 100 may realize the full screen. That is to say, the display screen 2 may be a full screen, and no hole is defined in the display screen 2. Thus, the appearance of the display screen 2 may be further improved, and the display range of the display screen 2 may be expanded. In addition, the size of the electronic device 100 may be reduced, such that the electronic device 100 may be miniaturized. Thus, it is convenient for the user to carry.

In the related art, the display screen 2 includes a visible window which can be seen from the outer side of the electronic device 100. The visible window includes a non-display area and a display area. The display area configured to display information including images, texts, and the like. In this way, the display screen 2 cannot be a full screen.

However, in some embodiments of the present disclosure, the non-display area may be disposed out of the visible window; that is to say, no non-display area can be seen from the outer side of the electronic device 100, which means the visible window consists of the display area.

More specifically, the housing 1 may include a back shell and a connected to the back shell and extending along a periphery of the back shell. A periphery of the display area of the display screen 2 may extend to the inner side wall of the frame, and thus a full screen display can be achieved. Herein, the display area may include the first display region 21 and the second display region 22.

In some embodiments of the present disclosure, as shown in FIG. 1, a damping strip may be disposed between the display screen 2 and the inner side wall of the housing 1. The damping strip may be made of rubber. By setting the damping strip, when the electronic device 100 is falling down, the collision between the display screen 2 and the housing 1 may be reduced. The damping strip may have a damping function, such that the display screen 2 may be protected, and the protection to the electronic device 100 during the falling down of the electronic device may be improved. In addition, the damping strip may also improve the sealing effect of the display screen 2 and the housing 1, and may have the functions of waterproofing and dustproof.

According to some embodiments of the present disclosure, as shown in FIGS. 1 and 4, the camera 3 may be located in the middle of the electronic device 100 in the left-right direction of the electronic device 100 (the left-right direction as shown in FIG. 1). This arrangement may better conform to the symmetrical aesthetic design. When the user is performing the shooting, the user's view angle may be aligned with the center of the display screen 2 via the camera 3 disposed in the middle of the electronic device 100. In this way, it is convenient for the user to observe the captured images, and thus it is convenient for the user to adjust the shooting postures and positions in time.

According to some embodiments of the present disclosure, as shown in FIG. 1, FIG. 2, FIG. 4 and FIG. 5, the electronic device 100 may further include a first driving mechanism. The first driving mechanism may be disposed in the housing 1, spaced apart from the camera 3, and further connected to the lens 31, in order to drive the lens 31 to move in the plane parallel to the first display region 21. The first driving mechanism may be a hydraulic driving device, a pneumatic driving device, an electric driving device, or a mechanical driving device. The first driving mechanism may help to achieve a stable movement of the lens 31 in the plane parallel to the first display region 21, and further achieve a precise movement of the lens 31. In this way, it is possible to improve the stability of the lens 31 during working.

According to some embodiments of the present disclosure, the electronic device 100 may further include a second driving mechanism. The second driving mechanism may be disposed in the housing 1, spaced apart from the camera 3, and further connected to the camera 3, in order to drive the camera 3 to move, such that the lens 31 of the camera 3 is moved in the plane parallel to the first display region 21. The second driving mechanism may be a hydraulic driving device, a pneumatic driving device, an electric driving device, or a mechanical driving device. The second driving mechanism may achieve a stable movement of the lens 31 of the camera 3 in the plane parallel to the first display region 21, and further achieve a precise movement of the lens 31 of the camera 3. In this way, it is possible to improve the stability of the lens 31 during working.

A method for taking a picture using the electronic device 100 according to some embodiments of the present disclosure will be described below with reference to the accompanying drawings.

As shown in FIG. 1, FIG. 2 and FIG. 7, the method for taking the picture by using the electronic device 100 according to the present disclosure may include: turning on the electronic device 100; taking a first picture at a first position by using the camera 3; driving at least a part of the camera 3 to move such that the lens 31 of the camera 3 is moved in the plane parallel to the first display region 21, and then taking at least one second picture at a second position different from the first position in the first display region 21; and synthesizing a target picture free from the pixels in the first display region 21 based on the first picture and the at least one second picture taken again. It is possible to take two or more second pictures at a plurality of second positions which are different from each other.

More specifically, as shown in FIG. 1, FIG. 2 and FIG. 7, when the electronic device 100 is configured to take pictures, the electronic device 100 may be firstly turned on to activate the camera 3. Secondly, the lights reflected by the scene may pass through the first display region 21, and further enter the lens 31 of the camera 3. After being processed by the camera 3, the shooting of the first picture is completed. Then at least a part of the camera 3 may be moved, such that the lens 31 of the camera 3 may be moved in the plane parallel to the first display region 21 to a plurality of second positions different from the first position. Besides, the plurality of second positions are also different from each other. At least one second picture may be taken at different positions. Finally, the target picture free from the pixels of the first display region 21 may be synthesized based on at least two initial pictures which have been taken before.

It should be noted that, turning on the electronic device 100 herein refers to turning on the electronic device 100 to activate the camera 3. The turning on of the electronic device may be achieved by triggering a physical button of the electronic device 100, or turning on an operating system of the electronic device 100 and further turning on the camera 3 via the operating system.

According to some embodiments of the present disclosure, as shown in FIG. 1, FIG. 2 and FIG. 8, the first display region 21 may include at least one first pixel unit 211. A pixel 2111 controllable to be transparent (that is, the pixel 2111 is capable of becoming transparent and non-transparent) may be disposed between two adjacent pixels of each first pixel unit 211. Before the user takes pictures using the camera 3, the pixel 2111 that is controllable to be transparent between the two adjacent pixels of the first pixel unit 211 may be controlled to become transparent. Therefore, the transparent pixel 2111 between the two adjacent pixels of each first pixel unit 211 may be controlled to become transparent during shooting, such that the transparent pixel 2111 may not block the lights reflected by the scene. In this way, the shooting of the camera may be completed.

The electronic device 100 and the method for taking a picture using the electronic device 100 according to some embodiments of the present disclosure may be described below with reference to the accompanying drawings. It may be understood that, the following description may be merely illustrative and not restrictive.

As shown in FIG. 1 and FIG. 2, the electronic device 100 of the present disclosure may be described by taking a mobile phone as an example. In the embodiment of the present disclosure, the electronic device 100 may include a housing 1, a display screen 2, a camera 3, a radio frequency circuit, a memory, an input unit, a wireless fidelity (WiFi) module, a sensor, an audio circuit, a processor, a fingerprint identification component, a power supply, and other components.

As shown in FIG. 2, the display screen 2 may be configured to display information input by the user or information provided to the user, and display various menus of the mobile phone. The display panel 2 may include a display panel configured by an OLED (Organic Light-Emitting Diode).

As shown in FIG. 1, FIG. 2 and FIG. 7, the display screen 2 may be mounted on the housing 1. The display screen 2 may be an OLED screen. The display screen 2 may define a first display region 21 and a second display region 22. The first display region 21 may have a pixel density less than that of the second display region 22. The first display region 21 may include a plurality of first pixel units 211, and the second display region 22 may include a plurality of second pixel units 221 arranged in an array. The plurality of second pixel units 221 may surround the plurality of first pixel units 211. An area of each pixel unit 211 may be equal to the total area of three second pixel units 221.

As shown in FIG. 1, FIG. 2 and FIG. 7, each of the first pixel unit 211 and the second pixel unit 221 include three pixels including a red pixel R (R as shown in FIG. 7) configured to emit red light, a green pixel G (G as shown in FIG. 7) configured to emit green light, and a blue pixel B (B as shown in FIG. 7) configured to emit blue light. A distance between two adjacent pixels of each first pixel unit 211 may be greater than a distance between two adjacent pixels of each second pixel unit 221. The pixels R, G, and B of each first pixel unit 211 may be may be located in pixel columns different from pixel columns in which the pixels R, G, and B of another first pixel unit 211 located in the same pixel column and the adjacent pixel row are located. In addition, three adjacent first pixel units 211 in the same column may form one synthesized pixel unit. The pixels R, G, and B in the three adjacent first pixel units 211 may be respectively located in pixel columns different from each other. That is to say, the at least one first pixel unit 211 may include a plurality of rows of first pixel units 211. The red pixels R of the first pixel units 211 in two adjacent rows are in different columns. The green pixels G of the first pixel units 211 in two adjacent rows are in different columns. The blue pixels B of the first pixel units 211 in two adjacent rows are in different columns.

As shown in FIG. 1, FIG. 2 and FIG. 7, the camera 3 may be disposed in the housing 1. The lens 31 of the camera 3 may face towards the first display region 21. The voice coil motor of the camera 3 may be connected to the lens 31 of the camera 3, and drive the lens 31 of the camera 3 to move to a plurality of different positions in the left-right direction (the left-right direction as shown in FIG. 5). At least two initial pictures may be taken at different positions in the first display region 21. After that, a target picture free from the pixels of the first display region 21 may be synthesized based on the at least two initial pictures.

As shown in FIG. 1, FIG. 2 and FIG. 7, when using the method for taking a picture by the electronic device 100 to take pictures, the electronic device 100 may be firstly turned on to activate the camera 3. Secondly, the lights reflected by the scene may pass through the first display region 21, and further enter the lens 31 of the camera 3. The first picture may be taken after being processed by the camera 3. After that, the voice coil motor may drive the lens 31 of the camera 3 to move to a plurality of different positions in the plane parallel to the first display region 21. At least one second picture may be taken at different positions. Finally, a target picture free from the pixels of the first display region 21 may be synthesized by the software algorithm based on the at least two initial pictures.

The radio frequency circuit may be configured to receive and transmit signals during the transmission and reception of information or a call. After receiving downlink information of a base station, the radio frequency circuit may forward the information to the processor. Furthermore, the radio frequency circuit may transmit uplink data of the mobile phone to the base station. Generally, the radio frequency circuit may include, but be not limited to, an antenna, at least one amplifier, a transceiver, a coupler, a low-noise amplifier, a duplexer, and the like. In addition, the radio frequency circuit may communicate with the network and other devices by means of wireless communication. The above wireless communication may adopt any communication standard or protocol including, but being not limited to, Global System for Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory may be configured to store software programs and modules. The processor may execute various functional applications and data processing of the mobile phone by running the software programs and modules stored in the memory. The memory may include a program storage region and a data storage region. The program storage region may be configured to store the operating system, at least one application required for achieving the functions (such as the functions of playing sounds, playing images, and the like). The data storage region may be configured to store data created based on the use of the mobile phone (such as audio data, phone book, and the like). Further, the memory may include a high-speed random access memory, and may also include a nonvolatile memory such as at least one magnetic disk storage device, a flash memory device, or other nonvolatile solid state storage device.

The input unit may be configured to receive input numeric or character information and generate key signals related to user settings and function controls of the mobile phone. More specifically, the input unit may include a touch panel and other input devices. The touch panel, also referred to as a touch screen, may collect touch operations of the user on or near the touch panel (such as the operations of the user on or near the touch panel using any suitable object or accessory such as a finger, a stylus, and the like). The corresponding connection device may be driven by the touch panel based on a preset program. Optionally, the touch panel may include two parts: a touch detection device and a touch controller. In some embodiments, the touch detection device may be configured to detect touch orientations of the user and signals caused by the touch operations, and transmit the signals to the touch controller. The touch controller may be configured to receive the touch information from the touch detection device, convert the touch information into contact coordinates, and send the touch information to the processor. The touch controller may also be configured to receive commands from the processor and execute the commands. In addition, the touch panel may be implemented in various ways. For example, the touch pane may be implemented as a resistive touch panel, a capacitive touch panel, an infrared touch panel, a surface acoustic wave touch panel, and the like. Except for the touch panel, the input unit may also include other input devices. More specifically, the other input devices may include, but be not limited to, one or more of a physical keyboard, a function key (such as a volume control button, a switch button, and the like), a trackball, a mouse, a joystick, and the like.

WiFi may be a short-range wireless transmission technology. The electronic device 100 may help the user to send and receive emails, browse web pages, and access streaming media via the WiFi module. Thus, the WiFi module may be configured to provide the user with wireless broadband Internet access. However, it may be understood that, it is unnecessary for the electronic device 100 to include the WiFi module. Thus, the WiFi module may be omitted as required within the scope of the present disclosure without changing the essence of the present disclosure.

In addition, the mobile phone may also include at least one type of sensors, such as a posture sensor, a light sensor, and other sensors.

More specifically, the posture sensor may also be referred to as a motion sensor. As one type of the motion sensor, a gravity sensor may be listed herein. The gravity sensor may use a resilient sensitive element to form a cantilever-type shifter, and use an energy-storage spring produced by the resilient sensitive element to drive an electrical contact. Thus, it is possible to convert a change in gravity into a change in electrical signals.

As another type of the motion sensor, an accelerometer sensor may be listed herein. The accelerometer sensor may be configured to detect acceleration in each direction (usually corresponding to three axes). When the mobile phone is motionless, the magnitude and the direction of the gravity may be detected by the accelerometer sensor. The accelerometer sensor may also be configured to identify the application of the posture (for example, a switching between a horizontal screen and vertical screen, related games, a calibration of posture of a magnetometer) of the mobile phone, and achieve functions (such as a pedometer, tapping) related to the identification of vibration, and the like.

In the embodiment of the present disclosure, the motion sensor listed above may be used as the element configured to acquire the "posture parameter" described later. However, the present disclosure may be not limited thereto. Other sensors capable of acquiring the "posture parameter", such as a gyroscope and the like, may fall within the protection scope of the present disclosure. The working principle and data processing procedure of the gyroscope may be similar to those in the related art, and thus a detailed description thereof will be omitted herein to avoid redundancy.

In addition, in some embodiments of the present disclosure, other sensors, such as a barometer, a hygrometer, a thermometer, an infrared sensor, and the like, may be provided. Details may be not described herein.

The light sensor may include an ambient light sensor and a proximity sensor. The ambient light sensor may be configured to adjust the brightness of the display panel based on the brightness of the ambient light. The proximity sensor may be configured to turn off the display panel and/or the backlight when the mobile phone moves to the ear.

The audio circuit, the speaker, and the microphone are audio interfaces between the user and the mobile terminal. The audio circuit may be configured to convert the received audio data into an electrical signal, and further transmit the electrical signal to the speaker. The speaker may be configured to convert the electrical signal into a sound signal, and further output the sound signal. On the other hand, the microphone may be configured to convert the collected sound signal into an electrical signal. The electrical signal may be further received by the audio circuit, and converted into audio data. The audio circuit may further output the audio data to the processor. The audio data may be then processed by the processor, sent via the radio frequency circuit to, for example, another mobile phone, or the memory for further processing.

The processor may be a control center of the electronic device 100. The processor may be mounted on a circuit board assembly, and may be connected to various portions of the entire electronic device 100 by various interfaces and lines. The processor may be configured to execute various functions and processing data of the electronic device 100 by running or executing the software programs and/or modules stored in the memory, and calling the data stored in the memory. In this way, it is possible to perform overall monitoring to the electronic device 100. Optionally, the processor may include one or more processing units. The processor may be integrated with an application processor and a modem processor. The application processor performs a process to the operating system, a user interface, an application, and the like. The modem processor handles wireless communications.

The power supply may be logically connected to the processor through a power management system, such that functions such as charging, discharging, power management, and the like, may be managed through the power management system. Although it is not shown herein, the electronic device 100 may further include a Bluetooth module, a sensor (such as a posture sensor, a light sensor, and other sensors such as a barometer, a hygrometer, a thermometer, an infrared sensor, and the like), and the like. Details may be not described herein.

It should be noted that, the mobile phone may be only an example of the electronic device 100. The present disclosure may be not limited thereto. The present disclosure may be applied to the electronic device 100 such as a mobile phone, a tablet computer, and the like. Therefore, the present disclosure may be not limited thereto.

In the description of the present specification, the description with reference to the terms "one embodiment", "some embodiments", "illustrative embodiment", "example", "specific example", or "some examples", and the like, means that a specific feature, structure, material, or characteristic described in connection with the embodiment or example is included in at least one embodiment or example of the present disclosure. Thus, the illustrative descriptions of the terms throughout this specification are not necessarily referring to the same embodiment or example of the present disclosure. Furthermore, the specific features, structures, materials, or characteristics may be combined in any suitable manner in one or more embodiments or examples.

Although embodiments of the present disclosure have been shown and described, it would be appreciated by those skilled in the art that changes, modifications, alternatives, and transformations can be made in the embodiments without departing from the principle and purpose of the present disclosure. The scope of the present disclosure may be defined by the claims and their equivalents.

What is claimed is:

1. An electronic device, comprising:
    a housing;
    a display screen, mounted on the housing and defining a first display region and a second display region, the first display region having a pixel density less than that of the second display region; and
    a camera, disposed in the housing and comprising a lens facing toward the first display region, wherein at least a part of the camera is movable, such that the lens of the camera is movable in a plane parallel to the first display region; the lens is configured to take at least two initial pictures at positions in the first display region that are different from each other; and a target picture free from pixels of the first display region is synthesized based on the at least two initial pictures;
    wherein the first display region comprises a plurality of first pixel units, pixels of the plurality of first pixel units are connected one-to-one to form at least one ring with a transparent region defined in a center of the at least one ring formed by the pixels of the plurality of first pixel units.

2. The electronic device of claim 1, wherein a plurality of second pixel units arranged in an array are disposed in the second display region; and an area of each of the plurality of first pixel units is greater than an area of each of the plurality of second pixel units.

3. The electronic device of claim 2, wherein the area of each of the plurality of first pixel units is an integral multiple of a total area of three of the plurality of second pixel units.

4. The electronic device of claim 2, wherein each of the plurality of first pixel units and the plurality of second pixel units comprises a red pixel configured to emit red light, a green pixel configured to emit green light, and a blue pixel configured to emit blue light; and a distance between two adjacent pixels of each of the plurality of first pixel units is greater than a distance between two adjacent pixels of each of the plurality of second pixel units.

5. The electronic device of claim 4, wherein the plurality of first pixel units are located in a first row, and three adjacent second pixel units are located in a second row parallel and adjacent to the first row; and each of the pixels of the plurality of first pixel units corresponds to one of the three adjacent second pixel units;
    the red pixel of each of the plurality of first pixel units is located in the same column as the red pixel of the corresponding second pixel unit of the three adjacent second pixel units;
    the green pixel of each of the plurality of first pixel units is located in the same column as the green pixel of the corresponding second pixel unit of the three adjacent second pixel units; and
    the blue pixel of each of the plurality of first pixel units is located in the same column as the blue pixel of the corresponding second pixel unit of the three adjacent second pixel units.

6. The electronic device of claim 4, wherein the plurality of first pixel units comprise a plurality of rows of first pixel units; the red pixels of the first pixel units in two adjacent rows are in different columns; the green pixels of the first pixel units in two adjacent rows are in different columns; and the blue pixels of the first pixel units in two adjacent rows are in different columns.

7. The electronic device of claim 6, wherein the first pixel units in three adjacent rows form one synthesized pixel unit; the red pixels of the first pixel units in three adjacent rows are in different columns; the green pixels of the first pixel units in three adjacent rows are in different columns; and the blue pixels of the first pixel units in three adjacent rows are in different columns.

8. The electronic device of claim 4, wherein at least one of the pixels of each of the plurality of first pixel units has a cross section of a circular shape, an elliptical shape, or a polygonal shape; or
    at least one of the pixels of each of the plurality of second pixel units has a cross section of a circular shape, an elliptical shape, or a polygonal shape.

9. The electronic device of claim 2, wherein the first display region has a shape of a circle, an ellipse, or a polygon.

10. The electronic device of claim 9, wherein the plurality of first pixel units are spaced apart from each other in a circumferential direction of the ring.

11. The electronic device of claim 9, wherein the pixels of the plurality of first pixel units are arranged in a plurality of concentric rings.

12. The electronic device of claim 11, wherein the pixels in two adjacent concentric rings are offset from each other; or
the pixels in two adjacent concentric rings are disposed in one-to-one correspondence, and a line connecting the two pixels in one-to-one correspondence on two adjacent concentric rings extends in a radial direction of the rings.

13. The electronic device of claim 12, wherein three pixels in one-to-one correspondence and disposed respectively in three adjacent rings are configured into one of the plurality of first pixel units; or
three adjacent pixels in the same ring are configured into one of the plurality of first pixel units.

14. The electronic device of claim 2, wherein a pixel capable of becoming transparent is disposed between two adjacent pixels of each of the plurality of first pixel units;
wherein in response to shooting, the pixel capable of becoming transparent is changed into transparent; and
in response to no shooting, the pixel capable of becoming transparent is displayed in colors, and the pixel capable of becoming transparent and two adjacent pixels of each of the plurality of first pixel units cooperatively display a picture.

15. An electronic device, comprising:
a housing;
a full display screen, mounted on the housing and defining a first display region and a second display region, wherein a plurality of first pixel units are disposed in the first display region, and a plurality of second pixel units arranged in an array are disposed in the second display region; each of the plurality of first pixel units and the plurality of second pixel units comprises a red pixel configured to emit red light, a green pixel configured to emit green light, and a blue pixel configured to emit blue light; and a distance between two adjacent pixels of each of the plurality of first pixel units is greater than a distance between two adjacent pixels of each of the plurality of second pixel units; and
a camera, disposed in the housing and comprising a lens facing toward the first display region; wherein the lens of the camera is movable in a plane parallel to the first display region; the lens is configured to take at least two initial pictures at positions in the first display region that are different from each other; and a target picture free from pixels of the first display region is synthesized based on the at least two initial pictures;
wherein pixels of the plurality of first pixel units are connected one-to-one to form at least one ring with a transparent region defined in a center of the at least one ring formed by the pixels of the plurality of first pixel units.

16. The electronic device of claim 15, wherein an area of each of the plurality of first pixel units is greater than an area of each of the plurality of second pixel units.

17. The electronic device of claim 15, wherein the plurality of first pixel units are located in a first row, and three adjacent second pixel units are located in a second row parallel and adjacent to the first row; each of the pixels of the plurality of first pixel units corresponds to one of the three adjacent second pixel units; the red pixel of each of the plurality of first pixel units is located in the same column as the red pixel of the corresponding second pixel unit of the three adjacent second pixel units; the green pixel of each of the plurality of first pixel units is located in the same column as the green pixel of the corresponding second pixel unit of the three adjacent second pixel units; and the blue pixel of each of the plurality of first pixel units is located in the same column as the blue pixel of the corresponding second pixel unit of the three adjacent second pixel units; or
the plurality of first pixel units comprise a plurality of rows of first pixel units; the red pixels of the first pixel units in two adjacent rows are in different columns; the green pixels of the first pixel units in two adjacent rows are in different columns; and the blue pixels of the first pixel units in two adjacent rows are in different columns.

18. The electronic device of claim 15, wherein the pixels of the plurality of first pixel units are arranged in a plurality of concentric rings; and
the pixels in two adjacent concentric rings are disposed in one-to-one correspondence, and a line connecting the two pixels in one-to-one correspondence on two adjacent concentric rings extends in a radial direction of the rings.

19. A method for taking a picture using the electronic device of claim 1, comprising:
turning on the electronic device;
taking a first picture at a first position by using the camera;
driving at least a part of the camera to move such that the lens of the camera is moved in the plane parallel to the first display region, and taking at least one second picture at a second position different from the first position in the first display region; and
synthesizing a target picture free from the pixels of the first display region based on the first picture and the at least one second picture.

20. The method of claim 19, wherein the plurality of first pixel units comprise a red pixel configured to emit red light, a green pixel configured to emit green light, and a blue pixel configured to emit blue light; and a pixel capable of becoming transparent is disposed between two adjacent pixels of each of the plurality of first pixel units; the pixel capable of becoming transparent and disposed between the two adjacent pixels of each of the plurality of first pixel units is controlled to be transparent before the camera takes a picture;
wherein in response to shooting, the pixel capable of becoming transparent is changed into transparent; and
in response to no shooting, the pixel capable of becoming transparent is displayed in colors, and the pixel capable of becoming transparent and two adjacent pixels of each of the plurality of first pixel units cooperatively display the picture.

* * * * *